US012171346B2

(12) United States Patent
Jarman

(10) Patent No.: US 12,171,346 B2
(45) Date of Patent: Dec. 24, 2024

(54) CONTAINER WITH TEXTURED SURFACE

(71) Applicant: Thomas Edward-Meyer Jarman, Napa, CA (US)

(72) Inventor: Thomas Edward-Meyer Jarman, Napa, CA (US)

( * ) Notice: Subject to any disclaimer, the term of this patent is extended or adjusted under 35 U.S.C. 154(b) by 0 days.

(21) Appl. No.: 18/597,615

(22) Filed: Mar. 6, 2024

(65) Prior Publication Data

US 2024/0298826 A1 Sep. 12, 2024

Related U.S. Application Data

(60) Provisional application No. 63/557,346, filed on Feb. 23, 2024, provisional application No. 63/489,136, filed on Mar. 8, 2023.

(51) Int. Cl.

| | |
|---|---|
| ***A47G 19/22*** | (2006.01) |
| ***B01F 23/2361*** | (2022.01) |
| ***B01F 23/237*** | (2022.01) |
| ***B01F 35/50*** | (2022.01) |
| ***B01F 35/512*** | (2022.01) |
| ***B01F 35/53*** | (2022.01) |
| *B01F 101/17* | (2022.01) |

(52) U.S. Cl.
CPC ...... *A47G 19/2205* (2013.01); *B01F 23/2361* (2022.01); *B01F 23/237611* (2022.01); *B01F 35/512* (2022.01); *B01F 35/514* (2022.01); *B01F 35/53* (2022.01); *B01F 2101/17* (2022.01)

(58) Field of Classification Search
CPC ............. A47G 19/2205; B01F 23/2361; B01F 23/237611; B01F 35/512; B01F 35/514; B01F 35/53; B01F 2101/17
USPC ........................................................... 216/31
See application file for complete search history.

(56) References Cited

U.S. PATENT DOCUMENTS

2015/0197371 A1* 7/2015 Deckers ................. B65D 23/02 215/12.2
2023/0044601 A1* 2/2023 Sylvester ........... C08G 18/6688

FOREIGN PATENT DOCUMENTS

GB 2258802 A * 2/1993 ......... A47G 19/2233
KR 101212323 B1 * 3/2012

* cited by examiner

*Primary Examiner* — Duy Vu N Deo
(74) *Attorney, Agent, or Firm* — Pillsbury Winthrop Shaw Pittman, LLP

(57) ABSTRACT

Provided are systems, methods, and apparatuses directed to a container for storing a liquid, the container including a textured surface configured to increase the liquid's dissolved oxygen content, the textured surface having fluid-obstructions configured to disrupt a flow of the liquid in at least one direction, said disruptions being effective to decrease a surface tension associated with the liquid and increasing a surface area associated with the liquid.

22 Claims, 10 Drawing Sheets

CONTAINER WITH TEXTURED SURFACE

CROSS-REFERENCE TO RELATED APPLICATIONS

This patent claims the benefit of U.S. Provisional Patent Application No. 63/489,136, filed Mar. 8, 2023, titled CONTAINER WITH TEXTURED SURFACE and U.S. Provisional Patent Application No. 63/557,346, filed Feb. 23, 2024, titled CONTAINER WITH TEXTURED SURFACE. The entire content of each afore-listed earlier-filed application is hereby incorporated by reference for all purposes.

BACKGROUND

1. Field

The present disclosure relates generally to containers featuring textured surfaces and methods for making, using, and operating the same.

2. Description of the Related Art

Dissolved oxygen is important to the aroma and taste of wine, especially red wine. Specifically, oxygen dissolved in wine permits the drinker to better identify the qualities and type of the wine with the drinker's olfactory system, while improving other properties, such as mouthfeel. Additionally, oxygenated wine changes the wine's taste profile, as oxygen is correlated with the breakdown of polyphenols, specifically tannic acids, which are in part responsible for the dry, harsh sensation the drinker experiences when tasting wine. Thus, oxygen—in some amounts (e.g., between five and ten parts per million, like between six and eight parts per million)—may improve the aromatic and taste properties of a wine.

Nevertheless, because oxygen can cause the breakdown of tannins in the wine, it is sometimes preferable to ensure that a wine's oxygen content remains low (e.g., below six parts per million) during storage. Storing wine with oxygen levels exceeding six parts per million may oxidize the wine, leading to multiple chemical reactions that may compromise the aromatic and taste qualities of the wine. For example, with respect to polyphenols, storage of wine with oxygen levels exceeding six parts per million may result in enzymatic browning. In other examples, with respect to ethanol present in the wine, storage of wine with oxygen levels exceeding six parts per million may result in the breakdown of ethanol into acetaldehyde.

For some purposes, therefore, it is beneficial to store some wines in such a way that the dissolved oxygen content is less than six parts per million but serve some wines with an oxygen content with oxygen contents that are at or above six parts per million. It is, therefore, beneficial to store wine in a low oxygen environment and, during or just before serving, rapidly (e.g., within between 30 seconds and 30 minutes, like between 1 and 15 minutes) increasing the amount of dissolved oxygen in the wine. None of which is to suggest that wine with oxygen levels outside these thresholds, either in storage or when consumed, is disclaimed or that any other use case or subject matter is disclaimed.

SUMMARY

The following is a non-exhaustive listing of some aspects of the present techniques. These and other aspects are described in the following disclosure.

Some aspects include a container including a bowl to at least partially enclose a liquid and an interior surface of the bowl, wherein the interior surface includes a first texture and a second texture. The first texture includes obstructions that, upon making contact with the liquid during movement, obstruct a flow of the liquid in at least a first direction.

Some aspects include a method for making a textured container, the method comprising: obtaining a container comprising a bowl configured to at least partially enclose a liquid; and an interior surface of the bowl; and creating a first texture on the interior surface of the bowl, wherein the first texture comprises obstructions that, upon making contact with the liquid during movement, obstruct a flow of the liquid in at least a first direction.

Some aspects include a method of aerating a liquid carrying contained within a container comprising: introducing a liquid into a bowl of a container, wherein an interior surface of the bowl comprises a first texture, wherein the first texture comprises obstructions, that upon making contact with the liquid during movement, obstruct a flow of the liquid in at least a first direction; swirling the liquid contained within the bowl of the container by imparting a rotational motion to the liquid by agitating the container, wherein the liquid makes contact with the obstructions of the first texture; and retaining the liquid on the sides of the bowl for a length of time to sufficiently aerate the liquid

BRIEF DESCRIPTION OF THE DRAWINGS

Aspects of the present invention will be better understood when the present application is read in view of the following figures in which like numbers indicate similar or identical elements.

Figure 1:
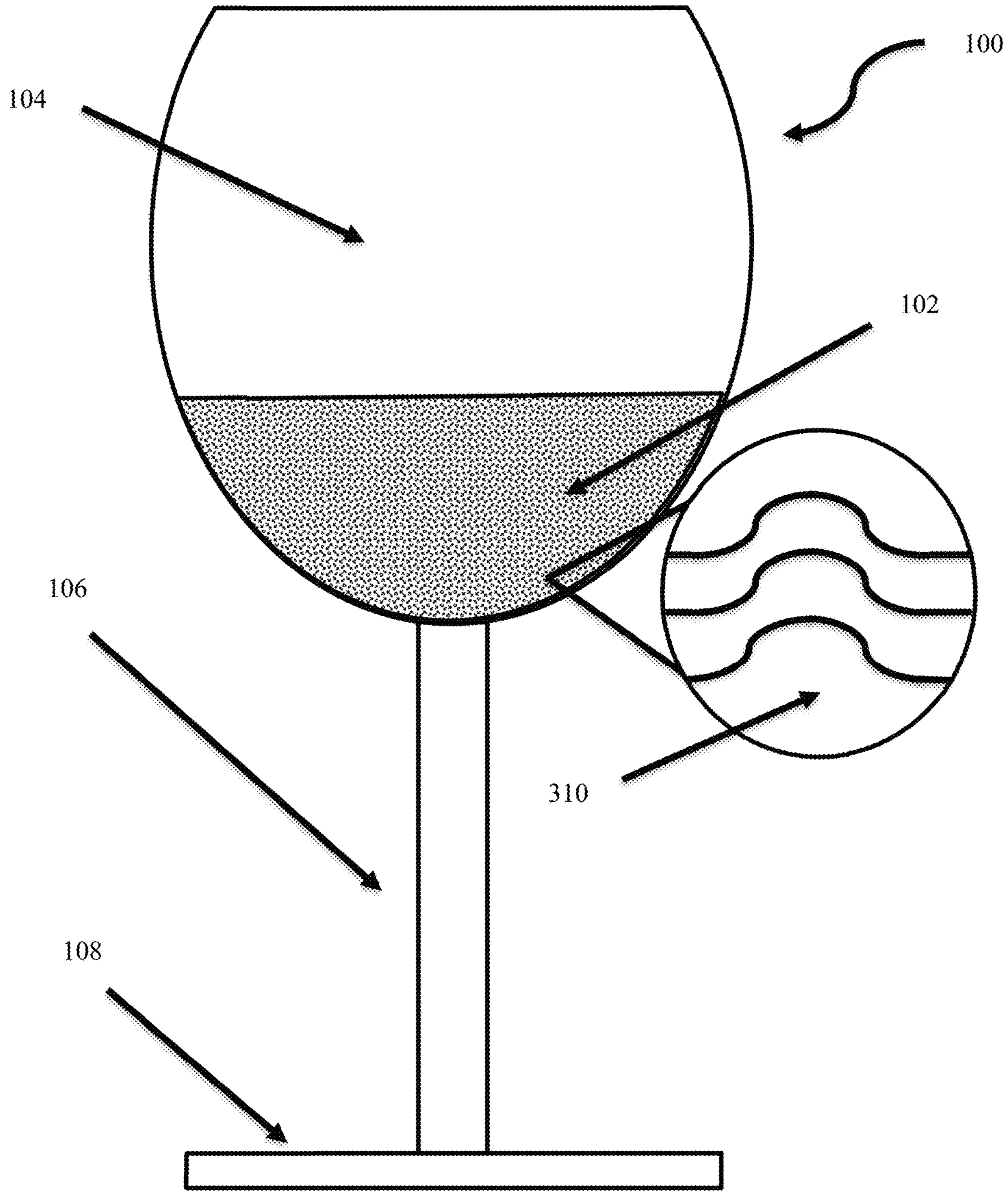
FIG. 1 is an elevation cross section of a wine glass textured with direction-agnostic, micro-level fluid obstructions, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of food and beverage preparation, glassware, cookware, and etching and engraving. Indeed, the inventor wishes to emphasize the difficulty of recognizing those problems that are nascent and will become much more apparent in the future should trends in industry continue as the inventors expect. Further, because multiple problems are addressed, some of the present embodiments are problem-specific, and not all embodiments address every problem with traditional systems described herein or provide every benefit described herein. That said, improvements that solve various permutations of these problems are described below.

Some embodiments may increase the dwell time of wine (or other liquids) swirled up on the side of a wine-glass bowl with a texture or other treatment. In some embodiments, a texture applied to the interior surface of the wine-glass bowl may tend to expose such wine to ambient oxygen in the atmosphere longer than un-treated wine glasses, in which the wine generally quickly runs down the side of the glass to the bulk liquid at the bottom of the bowl. In some cases, after swirling the glass, some embodiments may increase the surface area of wine exposed to ambient air (and the oxygen therein) by between 20% and 200%, or more. In some cases, dwell time of at least some of the up-swirled wine on a vertical surface of the glass may increase by between 10% and 100%, or more, relatively to smooth, untreated surfaces of wine glass bowls.

FIG. 1 is a cross-sectional elevation view of a wine glass 100 featuring a textured surface on at least a portion of a bowl 104 of the wine glass 100. The wine glass 100 may include a bowl 104, a stem 106, and a base 108. In some embodiments, the wine glass may feature a textured surface on 100% of the interior surface of the bowl 104. In some embodiments, the wine glass may feature a textured surface on more or less than 90%, 60%, or 20% of the bowl, e.g., between any pair of these percentages. In some cases, there may be a tradeoff between strength and amount of area that is textured to increase oxygenation, e.g., less than 80% and more than 20% of the interior surface of the bowl may be textured in some embodiments to strike a balance. In some embodiments, the wine glass may feature the textured surface on the base of the wine glass. In some embodiments, the wine glass may also feature the textured surface on the exterior of the bowl of the wine glass. In some embodiments, the interior portion of bowl of the wine glass may feature a portion of the bowl of the wine glass that is textured and another portion of the bowl of the wine glass that is smooth. In some embodiments, these surface areas may have treatments applied that afford a hydrophilic functionalization surface, e.g., with or without texturing.

In some embodiments, the interior surface of the bowl of the wine glass features two textures, where one portion of the interior portion of the wine glass features a first texture and another portion of the interior portion of the wine glass features a second texture. In some embodiments, the interior surface of the wine glass bowl may feature three textures. In examples of such embodiments, a bottom portion of the interior portion of the bowl of the wine glass may feature a first texture, an intermediate portion of the interior portion of the bowl of the wine glass may feature a second texture, a ring portion of the interior portion of the bowl of the wine glass may feature a third texture, and an upper portion of the interior portion of the bowl of the wine glass may feature the second texture. In some embodiments, the interior surface of the bowl of the wine glass may feature a plurality of textures. In some embodiments, the exterior portion of the bowl 104, stem 106, or base 108 of the wine glass 100 may feature a plurality of textures. In some embodiments, the exterior portion of the bowl 104, stem 106, or base 108 of the wine glass 100 may feature a single texture.

In some embodiments, the textured surface may be textured by one or more etching or engraving techniques (which are both examples of a surface-roughing process). Some techniques may be capable of high levels of details, creating texturing ranging in root-mean-square as measured by a profilometer from a few nanometers to several hundred microns (e.g., between 0.1 and 100 microns in width and depth). Some techniques, may create textures with a width or depth of 10 microns to 2 millimeters. Some techniques may result in larger-scale patterns (e.g., stripes of roughened surfaces) on the order of a few centimeters to an inch; in some embodiments, patterns on this order of magnitude may be referred to as macro-level patterns. Additionally, such macro-level patterns may be the result of a glass blowing technique in addition to or in lieu of etching or engraving.

In some embodiments, the textured surface may include a rough or otherwise irregular surface. In some embodiments, such roughness may be measured in micrometers or microinches. In some embodiments, the roughness of the surface may be measured by a unit larger than microinches, such as millimeters or centimeters. In some embodiments, the roughness of the surface may be measured using an root-mean-square (RMS) measurement output by profilometer as specified in ASME's B46.1 Surface Texture 2019 Edition specification. In some embodiments, the roughness of a surface may be computed as an average or arithmetic average of a profile height deviations with respect to the mean line. In some embodiments, a quadratic average of profile height deviations from the mean line may be used. In some embodiments, a maximum valley depth below the mean line or a maximum peak height above a mean line may be used. In some embodiments, the roughness measurement may capture information pertaining to the skewness—the asymmetry of the profile about the mean line. In some embodiments, the roughness measurement may reflect the measure of peakedness or tailedness of the profile about the mean line, also known as kurtosis.

FIG. 1 additionally illustrates a close-up of obstructions 310 (which may be referred to as protrusions or recesses in some cases) on a textured portion 102 of the wine glass 100. In some embodiments, the obstructions on the interior portion of the bowl of the wine glass is expected to be effective to cause disruptions in the flow of the wine or other fluid across the interior surface of the bowl of the wine glass are symmetrical in at least one dimension. In some embodiments, the obstructions 310 on the textured portion 102 interior portion of the bowl portion 104 of the wine glass feature rounded edges. In some cases, the textured portion 102 has a different hydrophilicity (e.g., a greater hydrophilicity) than other portions of the of the bowl. Some embodiments may have stacked rings of hydrophobic and hydrophilic regions on the interior surface, where the hydrophobic rings tend to aid adjacent, higher hydrophilic rings in retaining wine.

Figure 2:
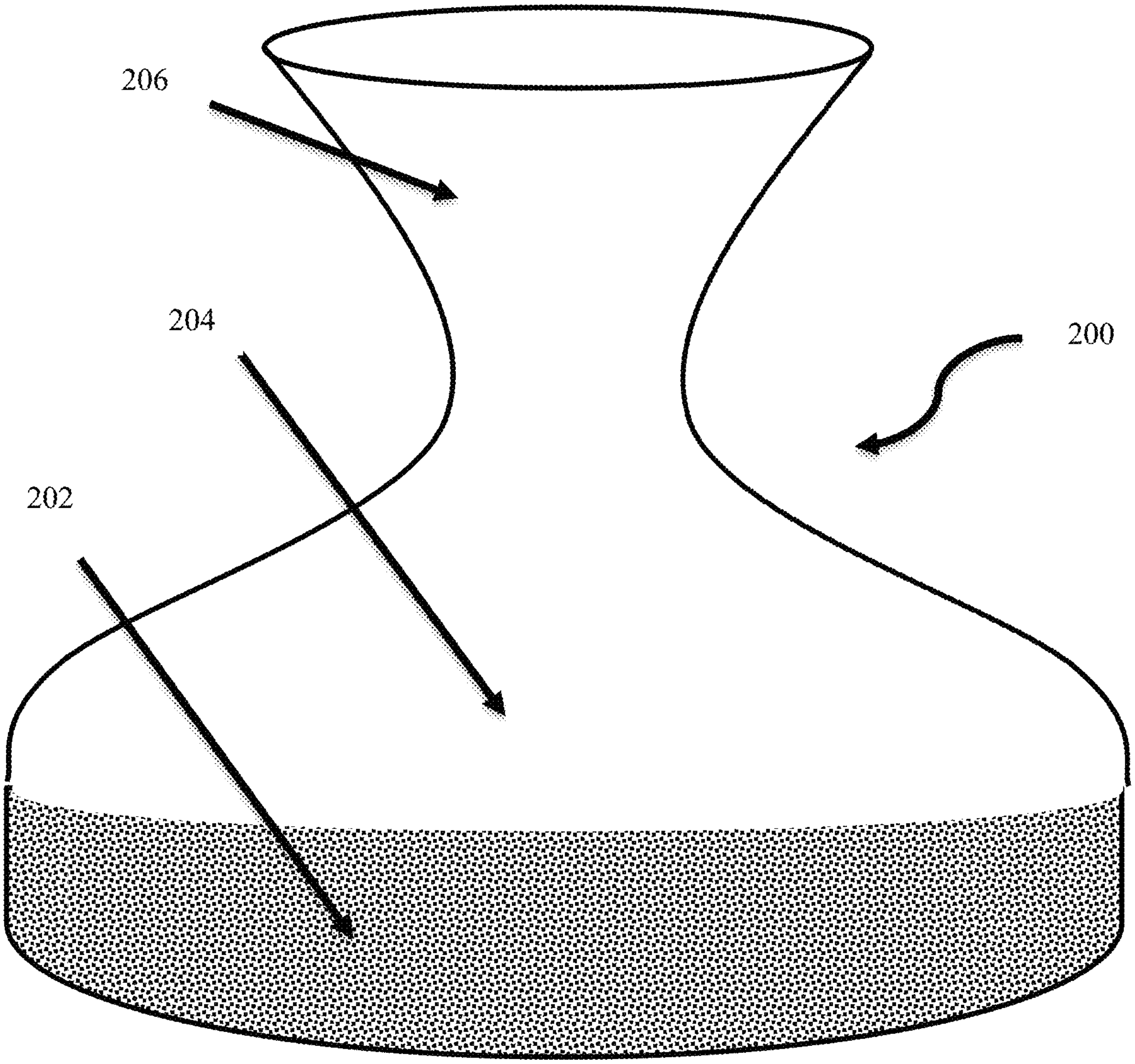
FIG. 2 is a perspective view of a decanter textured with direction-agnostic, micro-level fluid obstructions, in accordance with some embodiments of the present techniques.

FIG. 2 illustrates a decanter 200 with a spout 206, a bowl 204, and a textured portion of the interior surface of the decanter 202. In some embodiments, the textured portion 202 of the interior surface of the decanter 200 may be located on an interior portion of the bowl 204 of the decanter. In some embodiments, the entirety of the bowl 204 may be covered in the textured portion 202. In still other embodiments, only 50% or 10% of the bowl 204 may be covered by the textured portion 202. In some embodiments, one portion of the bowl 204 is covered by the textured portion and another portion of the bowl 204 is uncovered by the textured portion. In some embodiments, some portions of the interior portion of the spout 206 may be covered by the textured portion 202. In some embodiments, some portions of the exterior surface of the decanter 200 may be covered by the textured surface 202.

In some embodiments, the texture of the textured container (e.g., decanter 200 or wine glass 100 in FIGS. 1 and 2, respectively) may be achieved by laser etching or laser engraving or both. Laser etching may result in etches up to a depth of 0.001 inches. Laser engraving may result in cuts in the glass up to 0.02-0.125 inches. In some embodiments, Sub-Surface Laser Engraving (SSLE) may be used to engrave textures on the inside of a container via using a laser located on the outside of the container.

In some embodiments, the texture of the textured container is achieved by sandblasting the surface of a glass container, e.g., with an approach like that described below with reference to FIG. 7. A method of sandblasting may include performed by utilizing a sandblasting nozzle drawing media and pressurized air through hoses connected to the blast nozzle. The blast nozzle may be classified as a Venturi nozzle. Media used in the sandblasting method may range in grit size. Grit size and air pressure level used in the sandblasting method may be adjusted to create "peaks and valleys" of a desired size. Media used may include 10 to 200 grit, 20 to 120 grit, 40 to 90 grit, 80 grit, or any grit size falling within the ranges provided. Media may include sand, dry-ice, glass-beads, aluminum oxide, and the like.

In some embodiments, a negative image of the desired pattern may be carved out of a protective coating. In some embodiments, the protective coating may be applied to the surface of the container to be textured. In some embodiments, high velocity sand parties may be fired at the surface of the container to be textured. In some embodiments, sandblasters (capable of firing sand at speeds between 200 and 400 miles per hour) may be used. In some embodiments, industrial or professional models (capable of firing sand at speeds up to 800 miles per hour) may be used.

In some embodiments, the texture of the textured container is achieved by coating the surface of the glass container with a polymer that creates a rough surface when dry. This may be achieved by mixing the polymer (e.g., not-yet hardened epoxy resin or other reactive polymers or heated thermocast resin) with a food-grade particles of sufficient size to form peaks of the textured surface, like sand of the above-noted grit ranges. The number of peaks of the textured surface may be controlled by adjusting the ratio of the polymer mixture and the medium. In some embodiments, an epoxy resin may be mixed with sand of a sufficient grit size to apply a rough coating to the surface of the textured container. This approach is described in greater detail below with reference to FIG. 8.

In some embodiments, the textured container is so textured via the use of chemical etching. Such chemical etching may, in some embodiments, be used to increase the hydrophilicity of a surface by exposing the silicon glass to the water-containing fluids in the interior portion of the bowl of the wine glass, as silicon glass is inherently hydrophilic. In such embodiments, a chemical etching spray may be used. In exemplary embodiments, the chemical etching spray may be composed partly of hydrofluoric acid. In some embodiments, the chemical etching spray may be composed of a hexaflurosilicic acid. In some embodiments, a resist is placed on the surface of the glass that the manufacturer does not wish to be carved, etched, or engraved away. In some embodiments, after the resist is applied, the chemical etching spray is sprayed across the surface such that some chemical etching spray falls on the resist and some falls on the surface of the glass. In some embodiments, the chemical etching process is capable of etching details ranging from a few nanometers to several hundred microns.

In some embodiments, texture of the textured container may be achieved via the use of photolithography. In some embodiments, the substrate which may be glass is prepared for being coated with a LOR (lift off resist). In some embodiments, the substrate and its LOR coating may be prebaked. Subsequently, the substrate and LOR resist coating may be then coated with an imaging resist, in some embodiments, and then pre-baked. In some embodiments, the substrate with its multiple resist coatings may be exposed to UV light and subsequently post-baked. In some embodiments, the UV light may be applied to only a portion of the resist coatings, causing some of the resist coatings to be removed and some of the resist coatings to remain. In some embodiments, the removal of the resist in some locations but not in others creates a negative of the desired pattern. In some embodiments, an etching process may then be employed to cut away at the substrate in the exposed areas. Finally, in some embodiments, the resist may be removed, leaving behind the desired pattern etched into the surface of the glass.

In some embodiments, the texture of the textured container is achieved by plasma etching. In some embodiments, the plasma etching includes a gas composed of reactive ions (of oxygen, fluorine, or chlorine) are accelerated toward a plasma substrate interface at high speeds.

In some embodiments, the container may be made of glass such that the container satisfies the standards of the American Society for Testing and Materials regarding glass containers. For examples, some embodiments may pass a test method conforming to C147-86 Standard Test Method for Internal Pressure Strength of Glass Containers. In some embodiments, the container may pass a test method conforming to C149-14 Standard Test Method for Thermal Shock Resistance of Glass Containers. In some embodiments, the container may pass a test that implements or utilizes C224-78 Standard Practice for Sampling Containers. In some embodiments, the container may pass a test conforming to or utilizing the standard C148-17 Standard Test Methods for Polariscopic Examination of Glass Containers. In some cases, the glass includes a stabilizer, like calcium oxide. In some cases, the glass is crystal. In some cases, the glass is borosilicate glass.

In some embodiments, the wine container features directional texturing (which may feel relatively smooth when you slide your finger along it in one direction, but rougher in the other). In some embodiments, the directionally textured surface is configured to permit a swirling motion in one direction to cause a quiescent free flow of the wine across the textured surface of the glass but also to cause, responsive to a swirling motion in another direction, sudden disturbances in the flow of the wine across the surface of the glass. In some embodiments, the sudden disturbances in flow of the wine across the surface of the glass result in a turbulent flow of the wine that leads to a decreased surface tension on the surface of the wine, allowing oxygen gas to more easily permeate the fluid.

In some embodiments, the container is textured with macro-level (e.g., with a largest dimension larger than 5 mm) fluid obstructions, where such macro-level fluid obstructions may include patterns in the glass having peaks and troughs up to 2 centimeters deep. Exemplary patterns include waves, indentations, and scores. In some embodiments, the macro-level fluid obstructions are formed during the manufacture of the container via methods of glass blowing or engraving.

Figure 3A:
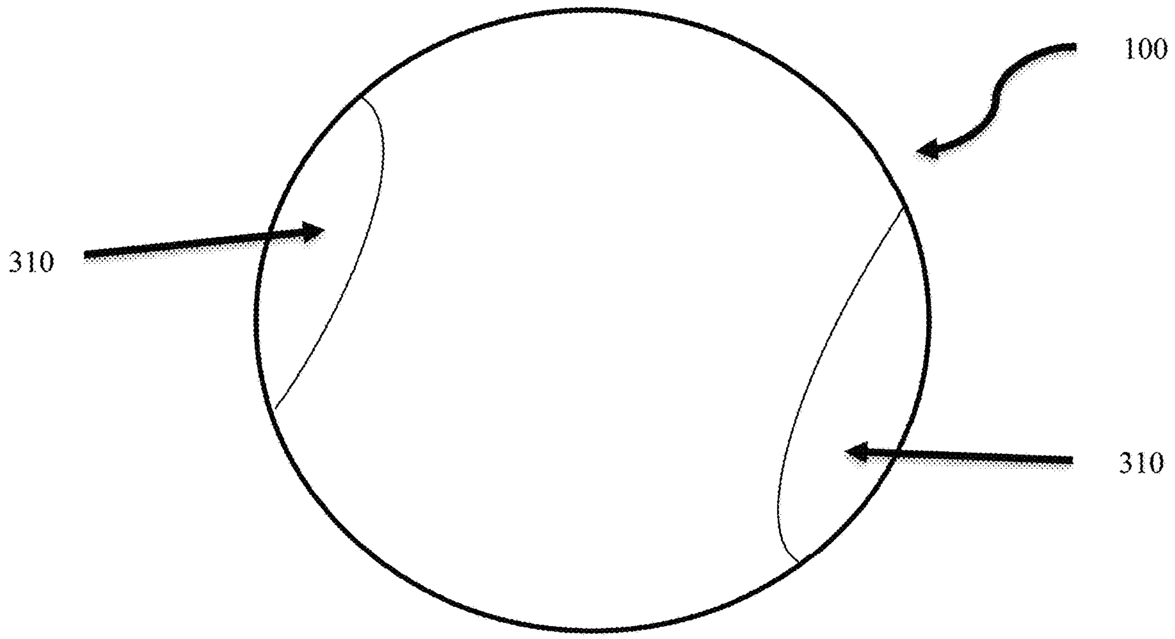
FIG. 3A is top view of a wine glass having counter-clockwise directional macro-level fluid obstructions, in accordance with some embodiments of the present techniques.

FIG. 3 illustrates an example of macro-level directional texturing. FIG. 3A illustrates counter-clockwise directional macro-level texturing. FIG. 3A illustrates a top view of a horizontal cross-section of a wine glass, but that is not to say that the concept of counter-clockwise directional macro-level texturing is confined to wine glasses. Instead, it should be understood that counter-clockwise directional macro-level texturing may apply to a variety of different containers of a plurality of types of fluids. In some examples of such embodiments, when the wine glass is swirled in such a way to effect the wine moving counter-clockwise in the interior of the bowl of the glass, macro-level fluid-obstructions 310 cause sudden disruptions in the flow of the wine. Such disruptions may cause splashing, turbulent flow, or otherwise break the surface tension of the wine. The breaking of the surface tension of the wine may increase the oxygen content of the wine by exposing a greater surface area of the wine to oxygen rich air. When the wine glass is spun in such a way as to effect the wine to move in a clockwise fashion. In such examples, the wine—running across the surface of the obstruction—may flow in a non-turbulent or laminar flow. Upon passing the obstruction 310 all or a portion of the wine may cease to make contact with the sides of the glass, allowing air (and thereby oxygen) down to a bottom portion of the glass. In some embodiments, the macro-level fluid obstruction 310 may take the form of an ornamental design in the wine glass. In some embodiments, the macro-level fluid obstruction 310 may be the result of adding more molten glass to the inside of a bowl of a wine glass during the glass blowing stage of the manufacturing process. In some embodiments, the macro-level fluid obstructions 310 may be the result of pinching the sides of the bowl of the wine glass during the glass blowing stage. In some embodiments, the obstructions 310 may be on the interior portion of the bowl of the wine glass alone, while the exterior portion of the bowl of the wine glass may be rotationally symmetrical about a vertical central axis of the wine glass.

Figure 3B:
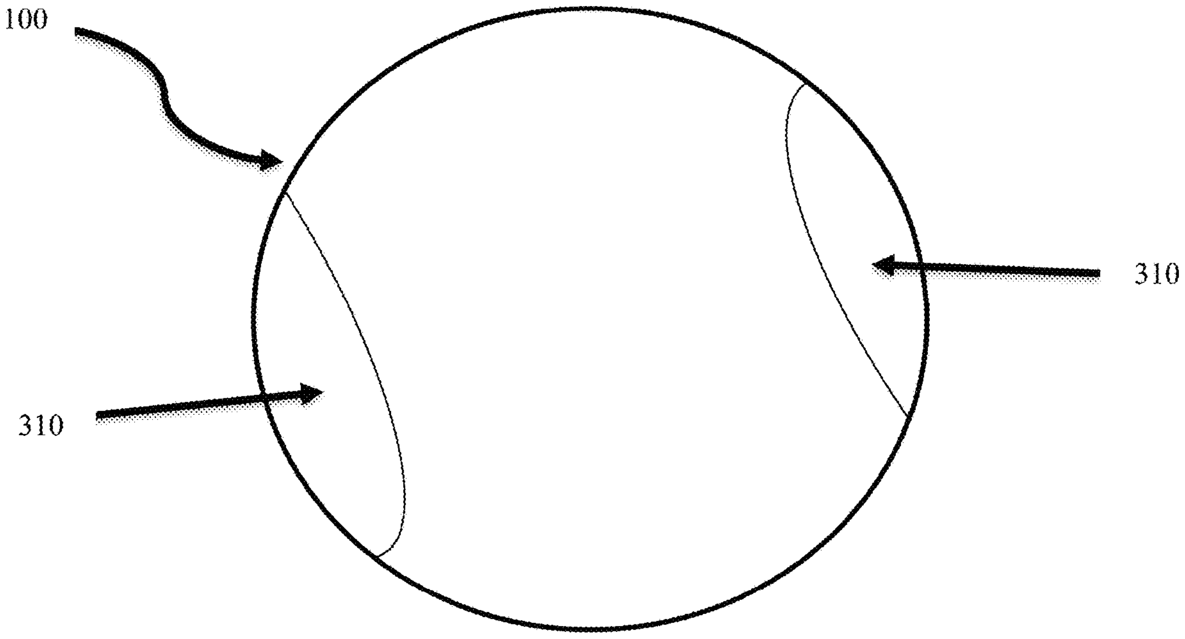
FIG. 3B is a top view of a wine glass having clockwise directional macro-level fluid obstructions, in accordance with some embodiments of the present techniques.

FIG. 3B illustrates a clockwise directional macro-level texturing. FIG. 3B illustrates a top-view of a horizontal cross-section of a wine glass, but that is not to say that the concept of a clockwise directional macro-level texturing is confined to wine glasses. Instead, it should be understood by one of ordinary skill in the art that clockwise directional macro-level texturing may also apply to a variety of other containers of a plurality of types of fluid. For example, clockwise directional macro-level texturing may be incorporated into a wine bottle. Additionally, a clockwise directional macro-level texturing may be incorporated into a decanter. Moreover, a clockwise macro-level texturing may be incorporated into an aerator. In some embodiments, when the wine glass is swirled in such a way to effect the wine moving in a clockwise fashion, the wine—upon making contact with the macro-level fluid obstructions 310—may experience a sudden disruption in flow in the form of a splash, turbulent flow, or some other flow that results in a decrease in surface tension. The resulting flow across the macro-level fluid obstructions 310 causes increased surface area of the wine. The increased surface area of the wine thereby allows more oxygen to permeate the wine. Such increased contact with oxygen rich air results in an increased oxygen content in the wine. When the wine glass is swirled (e.g., by a human hand) in such a way as to effect the counter-clockwise motion of the wine, the wine—running across the surface of the obstruction—may flow in a non-turbulent or laminar flow. Upon passing the macro-level fluid obstruction 310, the wine may cease to make contact with the sides of the glass, the fluid being carried by its momentum in the direction of the ramp formed by the macro-level fluid obstruction. The decreased contact with the sides of the interior portion of the bowl of the wine glass may facilitate oxygen rich air travelling to the bottom of the interior portion of the bowl of the wine glass or else permit oxygen rich air to travel further down into the bottom of the interior portion of the bowl of the wine glass than occurs when the wine is not spinning in a counter-clockwise fashion.

Figure 4:
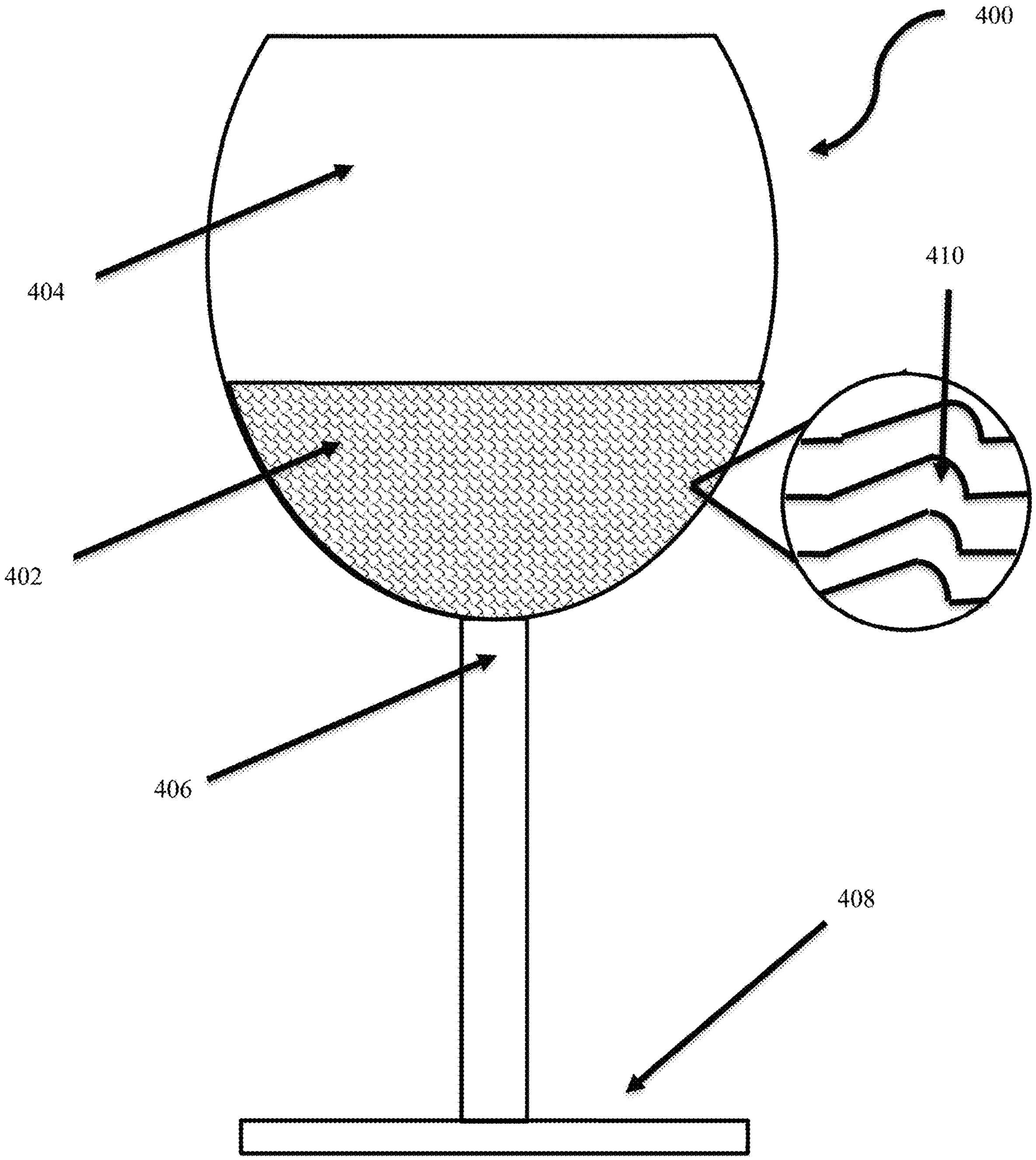
FIG. 4 is an elevation cross-section of a wine glass having directional micro-level fluid obstructions, in accordance with some embodiments of the present techniques.

FIG. 4 illustrates an example of a micro-level directional texturing. FIG. 4 illustrates a wine glass 400 having a bowl 404, a stem 406, a base 408, and a textured portion 402, where the textured portion 402 illustrates a micro-level directional fluid obstruction. It should be understood, however, that micro-level directional fluid obstruction are not limited to wine glasses having stems or bases; wine glasses that lack a stem may also feature micro-level directional fluid obstructions; wine glasses that lack a base may also feature micro-level directional fluid obstructions; wine glasses that feature a base integrated with the bowl may also feature micro-level directional fluid obstructions, which is not to suggest that any other feature or description is limiting. Additionally, it should be understood that while FIG. 4 depicts a wine glass with micro-level directional fluid obstructions, such embodiments featuring micro-level directional fluid obstructions may involve containers other than wine glasses. For example, exemplary containers may include decanters, aerators, boxes, bottles, etc.

FIG. 4 illustrates a close-up view of an example of the micro-level fluid obstructions 410.

Some embodiments may exploit the Gibbs-Marangoni effect, which describes a phenomenon that occurs in the presence of a gradient in surface tension. Where a single fluid of a single surface tension is present, any particular molecule of the fluid or a particulant floating on the surface of the fluid is pulled by equal forces in all directions. Upon introducing a fluid with lower surface tension on one side of the particular molecule of the fluid or the particulant floating on the surface of the fluid, the surface tension on the one side is significantly decreased and the tensional force exerted on the molecule or particulant is reduced. The result is that the tensional forces on the other side of the molecule or particulant exceeds the tensional forces pulling the molecule or particulant to the one side, thereby causing the molecule or particulant to be pulled in the other direction. Wine is a mixture of at least ethanol and water. Ethanol has a lower evaporating point (172 degree Fahrenheit or 78 degrees Celsius) than water (212 degrees Fahrenheit or 100 degrees Celsius). Consequently, when a user swirls a wine glass, causing the wine to flow up the sides of the glass, the ethanol evaporates at a faster rate than the water. This is expected to result in the wine on the sides of the glass having a lower ethanol content than the rest of the wine at the bottom of the glass. Water also has a greater surface tension than ethanol; thus, per the Gibbs-Marangoni effect, more wine is expected to be pulled up the sides of the glass. Because the surface tension of the water spreads a thin layer of wine across the sides of the glass, the wine on the sides of the glass is heavily exposed to oxygen rich air.

Figure 5:
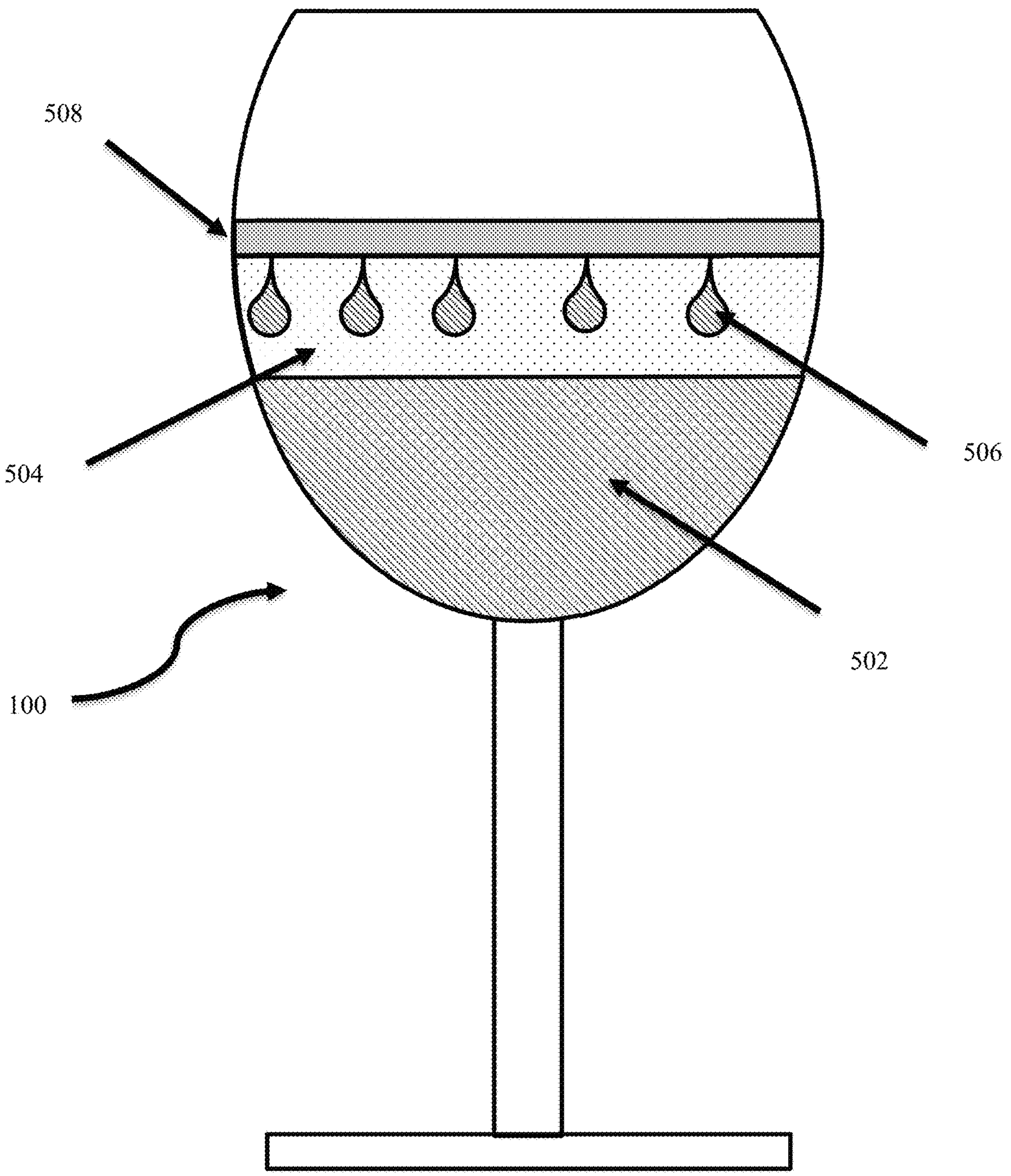
FIG. 5 is an elevation cross section of a wine glass configured to generate droplets of oxygen rich wine on the sides of the glass via a ring of hydrophobic material, in accordance with some embodiments of the present techniques.

FIG. 5 illustrates an example of a wine glass 100 featuring a ring 508 of hydrophobic material on the interior portion of the bowl of the wine glass 100. In some embodiments, the hydrophobic material may be hydrophobic glass made up of glass and a hydrophobic substance, where the hydrophobic substance is mixed with the glass at the manufacturing or glass blowing stage of production. In some embodiments, the hydrophobic material may be a hydrophobic coating (e.g., silica spray) applied after the manufacture of the wine glass 100. In some embodiments, the use of the hydrophobic material—whether the hydrophobic material be hydrophobic glass or glass covered with a hydrophobic coating—may be in lieu of or in addition to the use of textured surfaces. FIG. 5 also illustrates a bottom region of the wine glass 502, an intermediate region of the wine glass 504, and wine droplets 506. While FIG. 5 depicts a wine glass having a bowl, a stem, and a base, it should be understood that embodiments may include wine glasses that lack one or more of these features. Additionally, it should be well understood that embodiments may include containers which are not wine glasses, such as bottles, boxes, decanters, aerators, and other vessels.

In some embodiments, the bottom region of the wine glass bowl interior 502 features a textured surface. The textured surface may include a macro-level texture, a micro-level texture, some intermediate texture, or a combination thereof. In such embodiments, the texture of the bottom region of the wine glass 502 may be directional or symmetrical. In some cases, the wine glass remains translucent or transparent after the texture is applied.

In some embodiments, the bottom region of the wine glass 502 may feature a hydrophobic substance in lieu of or in addition to a textured surface. In such embodiments, the bottom region of the wine glass 502 may be covered in a food grade hydrophobic coating. In some embodiments, the bottom of the glass may be coated in a layer of wax. In some embodiments, the bottom region of the wine glass may be made of a composite of glass and a hydrophobic substance.

In some embodiments, the bottom region of the wine glass 502 may feature a hydrophilic substance in lieu of or in addition to a textured surface. In such embodiments, the bottom region of the wine glass 502 may be covered in a food grade hydrophilic coating. In some embodiments, the bottom of the glass may be coated in a layer of wax. In some embodiments, the bottom region of the wine glass may be made of a composite of glass and a hydrophilic substance.

In some embodiments, the intermediate region 504 comprises smooth glass that is untreated with a textured surface, a hydrophilic substance (whether a coating or otherwise), or a hydrophobic substance (whether a coating or otherwise). In other embodiments, intermediate region 504 may include a hydrophilic substance. In some such embodiments, the hydrophilic substance may either be a composite of glass and a hydrophilic dopant that is introduced during the manufacturing process of the glass or in the glass blowing phase of production. In such embodiments, the hydrophilic substance may have the benefit of spreading the wine over the surface of the intermediate portion 504 of the wine glass 100 such that the wine is exposed to oxygen rich air. The spreading of the wine across the surface of the intermediate portion may therefore have the effect of increasing the oxygen content of the wine. In some embodiments, the hydrophilic substance may be a food grade hydrophilic substance. In still other embodiments, the hydrophilic substance may be glass (silicon glass already has the property of being hydrophilic). In still other embodiments, the intermediate portion of the wine glass may feature a hydrophobic substance. The hydrophobic substance may be a food grade hydrophobic substance. In some embodiments, the hydrophobic substance may be a coating or may be integrated into the glass during the manufacturing process.

Some embodiments may include narrow channels (e.g., between 1 micron and 1 mm in width) that extend vertically up the interior surface of the bowl to draw wine upward through capillary action.

In some embodiments, the ring 508 of hydrophobic substance may comprise a food grade hydrophobic substance. In some embodiments, the ring may be comprised of a wax or silica coating. In other embodiments, the hydrophobic substance may be a composite of glass and a dopant, where the dopant and the glass are mixed and set during the manufacturing process of the wine glass 100. The ring of hydrophobic substance may have the benefit of contributing to the generation of droplets 506. Per the Gibbs-Marangoni effect, fluids with higher surface tensions pull on fluids with lower surface tensions. After a user swirls the glass 100, some wine is left on the sides of the glass 100. Wine is in part a mixture of ethanol and water. Because ethanol has a lower evaporation point than water, the ethanol evaporates before the wine does. When wine is located on the sides of the glass, it is more likely to evaporate; thus, the ethanol may evaporate first, leading to the wine on the side of the glass having a higher water content than the wine in the bottom portion of the glass 502. As a result, the wine on the surface of the bottom region of the wine glass 502 is expected to be pulled up the sides of the glass. While on the sides of the glass, the wine held up by the Gibbs-Marangoni effect may exist as a thin layer of wine on the sides of the glass 100. The result is expected to be that more wine is directly exposed to air, leading to a higher oxygen content in the wine on the sides of the glass than in the wine in the bottom region of the glass 502. In order to reincorporate this oxygen rich wine into the wine at the bottom of the glass, it may be helpful to have a ring of a hydrophobic substance to assist in the production of droplets 506 that will return oxygen rich wine to the bottom region of the glass 502.

Figure 6:
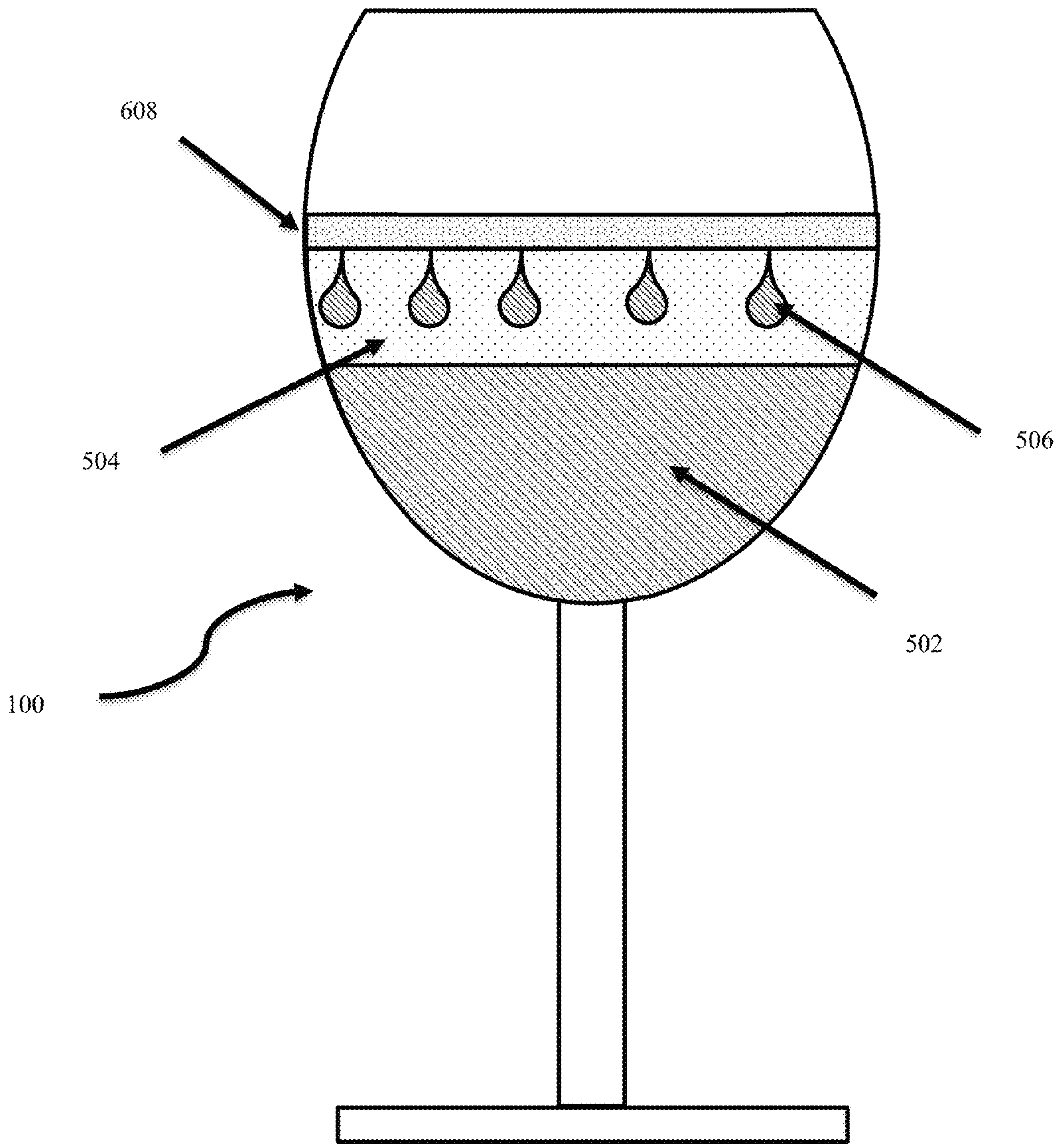
FIG. 6 is an elevation cross section of a wine glass configured to generate droplets of oxygen rich wine on the sides of the glass via a ring of a textured glass, in accordance with some embodiments of the present techniques.

FIG. 6 illustrates an example of a wine glass 100 featuring a ring 608 of textured glass configured to create droplets 506 that, upon falling, return oxygen rich wine back to the bottom of the glass 502. In some embodiments, a container is textured so as to create channels to concentrate wine on the sides of the container. In such an embodiment, the walls of the channels may overhang the sides of the glass such that surface tension of the wine is less than the force exerted on the fluid by gravity. Consequently, for this example, the tensile strength of the wine is strong enough only to pull the wine into the trench of the channel.

As wine travels up the sides of the container due to the Gibbs-Marangoni effect, the amount of ethanol present in the wine is expected to decrease. The decrease in the wine's ethanol content may be due, in part, to the layer of wine thinning as the vertical distance of the wine on the side of the container increases. The thinner layer of wine as the vertical distance of the wine on the side of the container increases potentially means that a higher percentage of the ethanol in the wine is on the wine's surface. Because ethanol evaporates at a lower temperature than water, the wine has its lowest ethanol content the higher up the sides of the wine container the wine extends. In other words, because wine—as it travels further up the sides of the glass—increases in tensile strength due to the increased evaporation of ethanol, the wine travelling up the channel can pull more wine into the channel, forming a droplet. Such channels, therefore, may have the benefit of promoting the return of oxygen rich wine suspended on the sides of the container due to the Gibbs-Marangoni effect back to the rest of the wine at the bottom of the container. In some embodiments, the container may be made entirely or partly of hydrophobic glass or of glass with a hydrophobic coating. In exemplary embodiments, such hydrophobic glass is produced via the use of Metal Assisted Chemical Etching (MACE), where MACE may be used to produce robust hydrophobic substances without appreciable compromise on transmittance. In some embodiments, MACE may be used to develop controlled structure surface roughness on a glass substrate and modify the surface chemistry with a silane treatment. For reference, see Muhammad Basit Ansari et. al., *A Potential Method to Induce Hydrophobicity on Glass Surface while Retaining its Anti-Reflective Abilities,* 257 Optik 168866 (2022), which is hereby incorporated by reference. In some embodiments, the container may be made entirely or partly of a super-hydrophobic glass or of glass with a super-hydrophobic coating. The presence of the hydrophobic glass or hydrophobic coating on the sides of the container will repel the water, causing discrete droplets to form and fall back into the rest of the wine at the bottom of the container. In some embodiments, the container may be made entirely or partly of omniphobic glass or of glass with a omniphobic coating. Such hydrophobic coating includes waxes. Such hydrophobic coatings may also include food-grade hydrophobic coatings.

In some embodiments, the container may feature a hydrophilic coating in addition to or instead of physical obstructions on the surface of the container. In examples of such embodiments, the hydrophilic coating may be effective to spread wine across the surface of the sides of the container, creating a thin layer of wine on the sides of the container. In such examples, the thin layer of wine may have—but need not—have the benefit of exposing a greater percentage of wine to the air, thereby increasing the exposure of the wine to an oxygen rich environment.

Figure 7:
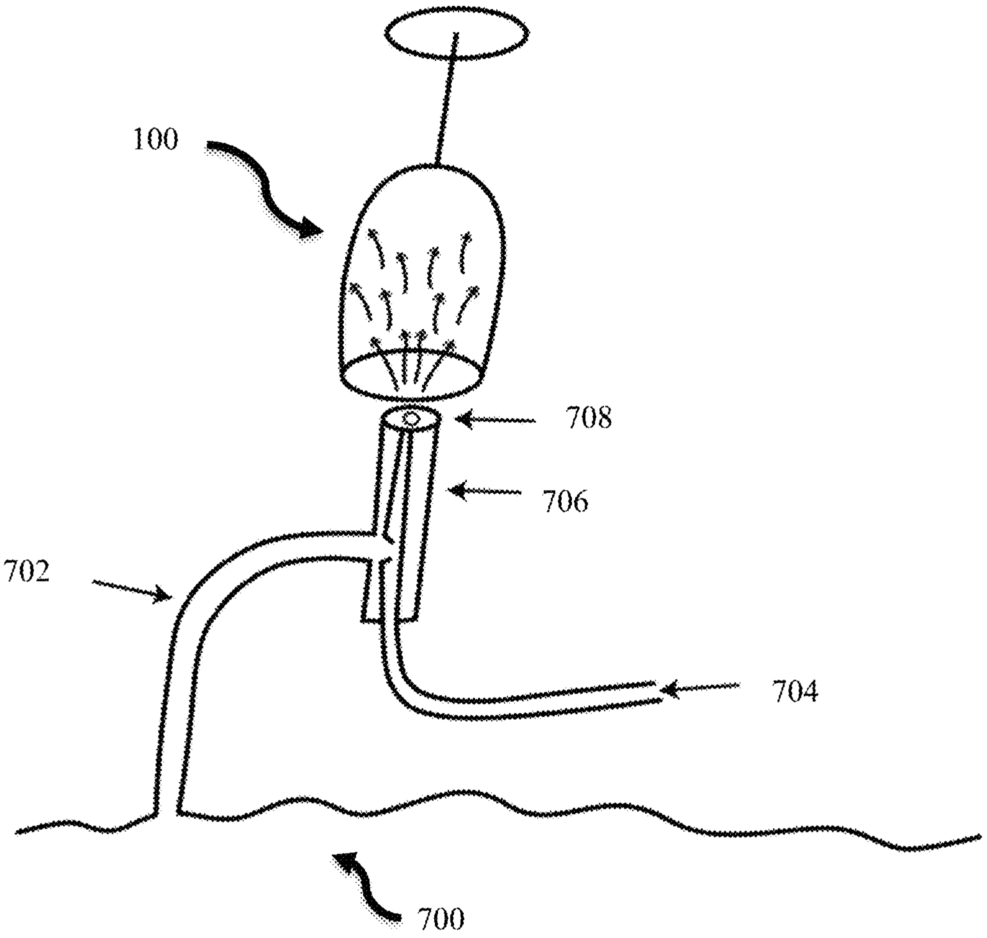
FIG. 7 is a depiction of a process of creating a textured container by sandblasting a surface of a glass container, in accordance with some embodiments of the present techniques.

FIG. 7 illustrates an embodiment of a tool for creating a textured container by sandblasting a surface of a wine glass 100. A blast nozzle 708 may be connected by hose 702 to media 700 for the sandblasting process. An air supply 704 may also be connected to the blast nozzle 708. In operation, air from the supply 704 may carry sand through the nozzle 708 to the interior surface of the bowl of glass 100. In some embodiments, the media 700 used is 80-grit sand. In the embodiment shown, the blast nozzle 708 may be classified as a Venturi nozzle, wherein the blast nozzle contains a constricted section 706 to speed up the movement of air and sand as it passes through the constricted section 706. A variety of air pressures may be used, e.g., between 20 and 300 psi (pounds per square inch), like between 80 and 200 psi.

Figure 8:
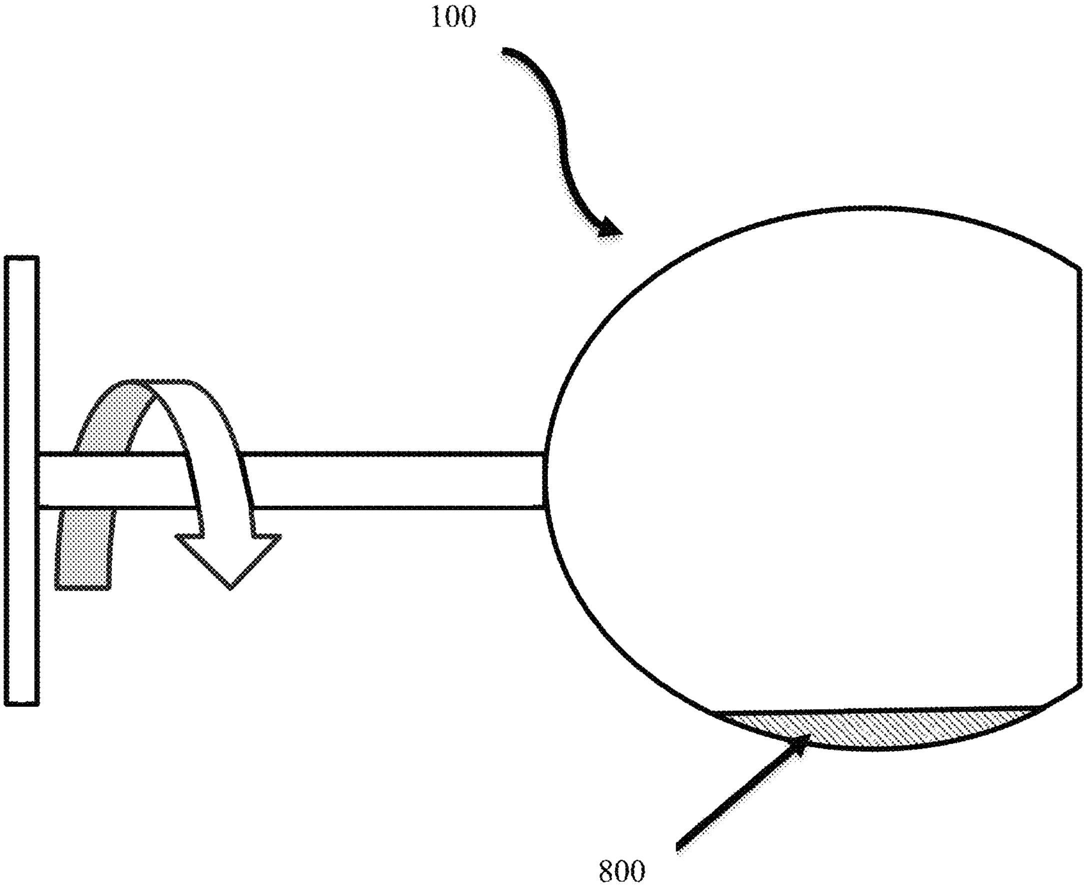
FIG. 8 is a depiction of creating a textured container by coating the surface of the glass container with an abrasive layer and rotating the container to apply the coating to the surface of the glass container, in accordance with some embodiments of the present techniques.

FIG. 8 illustrates an embodiment of a tool for creating a textured container by applying an epoxy coating with particulates to the interior surface of a wine glass. In the embodiment shown, a mixture 800 of not-yet-cured epoxy resin and 70-grit sand may be placed inside the bowl of the wine glass 100. The glass 100 is then rotated so as to allow the mixture to flow from the side of the wine glass interior and spread evenly across a portion of the interior surface of the glass. The coating of the glass by the mixture 800 may depend on facture like viscosity, rotation rate, and glass geometry, and can be mathematically modeled using fluid dynamics equations. In some embodiments, the mixture includes a 4:1 ratio of epoxy resin to 70-grit sand. For example, the mixture may include approximately 4 tablespoons of epoxy and 1 tablespoon of 70-grit sand. The resin may be a two-part resin, allowing the resin to cure at room temperature. The glass 100 may continue to be rotated (e.g., at between 1 and 20 rotations per minute) until the mixture 800 evenly coats at least a portion of the interior of the wine glass or the coating is completely dry.

Figure 9:
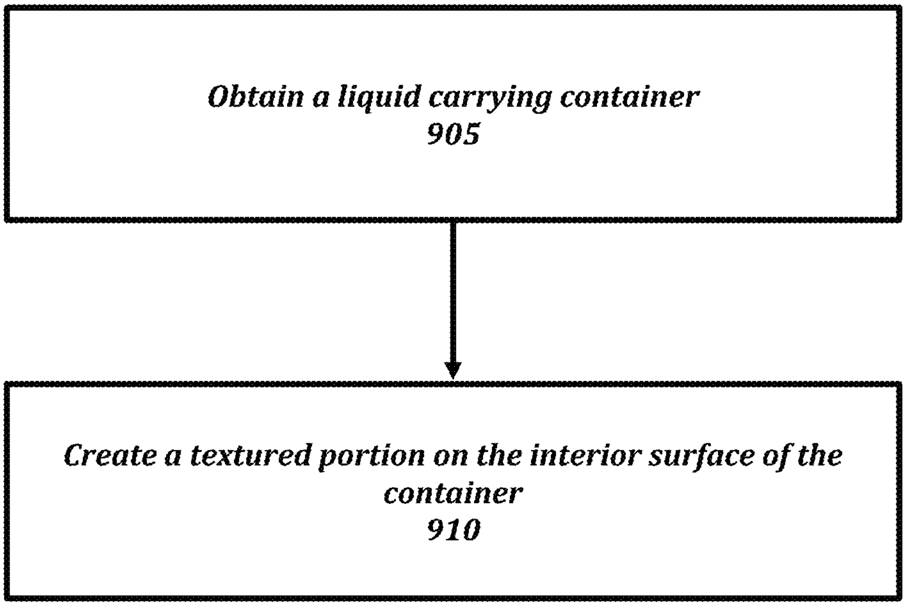
FIG. 9 is a flowchart depicting a process for making a textured container, in accordance with some embodiments of the present techniques.

FIG. 9 depicts a method for creating a texture container. A wine glass or other liquid carrying container may be obtained 905 to create a textured container. The obtained contained may then be textured 910 using any method or combination of methods herein described. The texturing method used to create a textured surface on at least a portion of the interior surface of the container bowl may include but is not limited to; sandblasting, laser etching or engraving, chemical etching or engraving, or coating the interior surface with an epoxy mixture.

Figure 10:
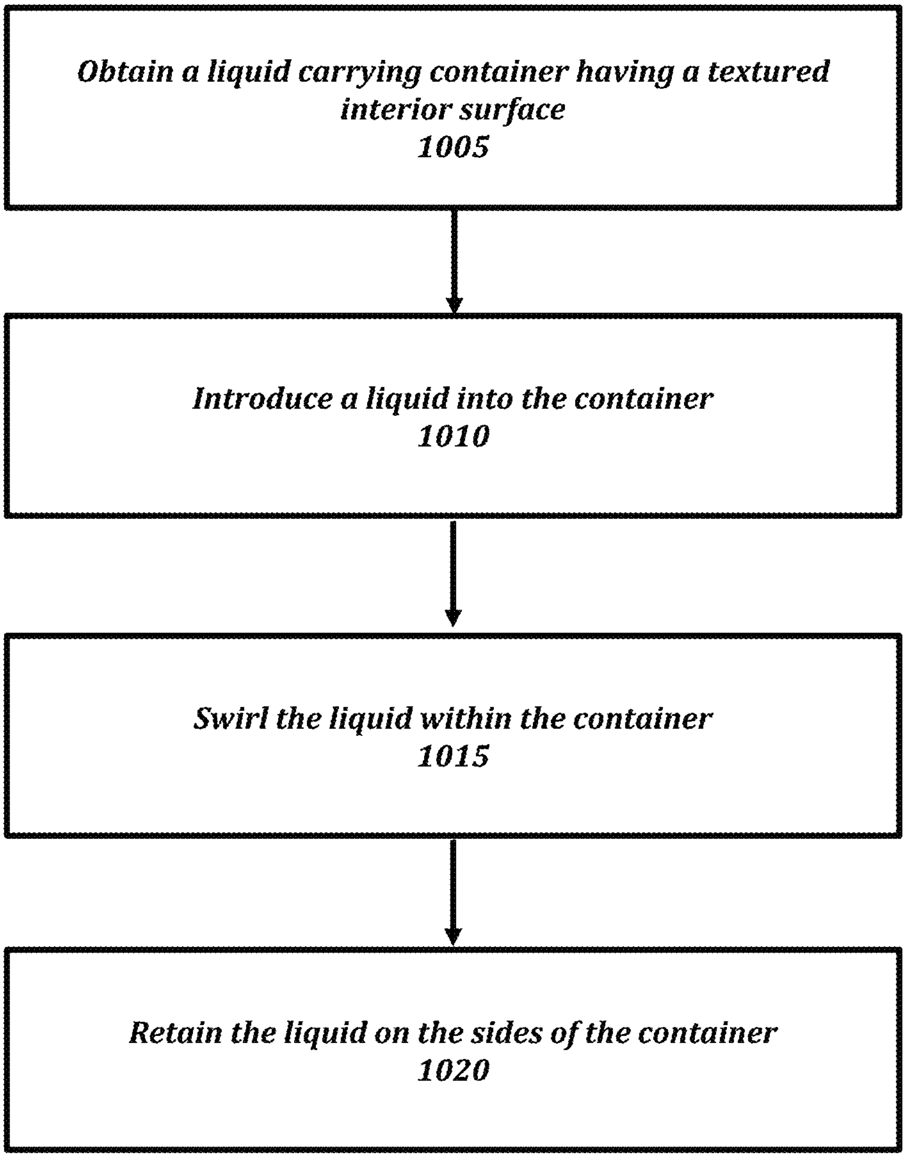
FIG. 10 is a flowchart depicting a process of aerating a liquid carrying contained within a container, in accordance with some embodiments of the present techniques.

FIG. 10 depicts a method for using a textured container. First, a container including a textured interior surface is obtained 1005. A liquid is introduced into the bowl of the container 1010 then swirled about the interior of the container 1015. The swirling of the liquid may be continued to sufficiently retain the liquid on the sides of the container 1020 to achieve desired effects of aerating a liquid. In an exemplary embodiment, the liquid introduced into the container is wine.

In some embodiments, the container is a wine glass. Exemplary wine glasses include but are not limited to Cabernet, Burgundy, Bordeaux, Zinfandel, Pinot Noir, Ros, Universal, Grand Cru, Syrah, and Cordial glasses. In some embodiments, the wine glass features a base, a stem, and a bowl. In some embodiments, the wine glass may include a base and bowl but no stem. In some embodiments, the wine glass may include only a bowl or a bowl with an integrated base. In some embodiments, the stem and base are hollow and the bowl features a hole, permitting wine to fill the base and stem of the wine glass. In some embodiments, the stem may be centered with respect to the base and the bowl. In some embodiments, the stem may be centered with respect to the base but not the bowl. In some embodiments, the stem may be center with respect to the bowl but not the base. In some embodiments, the stem may be off center with respect to both the bowl and the base. In some embodiments, the glass is rotationally symmetric about a central vertical axis.

In some embodiments, the container is a decanter. Exemplary decanters include but are not limited to Standard, U-Shaped, Swan, Snail-Shaped, electric, Bell-Shaped, Cylindrical, Barrel Shaped, Globe, Diamond, Square, and Twist decanters.

In some embodiments, the container is an aerator. In some embodiment, the aerator may be integrated into a wine glass or decanter. In other embodiments, the aerator may be attachable to a wine glass. In other embodiments, the aerator may be integrated into a container configured to store wine, such as a wine bottle or wine box. An aerator may have the surface textures described herein applied to surface over which the wine flows, even if the aerator does not persistently contain the wine (e.g., if the wine passes through the aerator to flow into another container).

In some embodiments, the container is made in shape that permits the fluid to move in laminar flow (or turbulent flow) when the container is moved in a swirling motion at the stem. In some embodiments, the container is a wine glass. In examples of such embodiments, the wine glass may feature a bowl with round surfaces. In other examples of such embodiments, the bowl of the wine glass lacks sharp corners, thereby preventing spilling or splashing. In some embodiments, the bowl of the wine glass is circular. In other embodiments, the bowl of the wine glass is ovular. In still other embodiments, a vertical view of the wine glass reveals that the horizontal cross-section of the bowl of the wine glass is an irregular shape but nonetheless lacks sharp corners.

In some embodiments, the container is a wine glass and a vertical view of the horizontal cross-section of the wine glass's bowl has a polygonal shape. In some embodiments, the vertical view of the horizontal cross-section of the wine glass is a triangular shape. In some embodiments, the vertical view of the horizontal cross-section of the wine glass is a four-sided polygonal shape, where each side may be of an equal length. In some embodiments, the vertical view of the horizontal cross-section of the wine glass is a four-sided polygonal shape, where one pair of sides are of a different length than another pair of sides. In some embodiments, the vertical view of the horizontal cross-section of the wine glass's bowl has a polygonal shape of a dimension greater than four. In some embodiments, the vertical view of the horizontal cross-section having a polygonal shape features rounded corners. In some embodiments, a wine glass, having a polygonal vertical view of its horizontal cross-section, has corners that are rounded on the exterior of the glass but make right angles on the interior of the bowl of the wine glass. In some embodiments, a wine glass, having a polygonal vertical view of its horizontal cross section, features rounded corners on the exterior of the bowl of the wine glass and unrounded corners on the interior of the wine glass.

In some embodiments, the container may be made of glass. In such embodiments, the glass may be a high strength glass or a shatter resistant glass. In some embodiments, the glass may be conventional annealed glass and subsequently treated or coated so as to render the wine glass more shatter proof. In some embodiments, the glass may be chemically treated glass. In some embodiments, the glass—during its manufacture—may be strengthened via an ion exchange process, where the glass may be placed in a molten alkaline potassium salt. In such embodiments, the smaller sodium ions in the glass may be replaced by larger potassium ions from the salt and the larger ions occupy more volume, creating a surface layer of high residual compressive stress. In such embodiments, the creation of a surface layer of high residual compressive stress may afford the glass surface with increased strength, resilience to flaws, and improved shatter resistance.

In some embodiments, the glass may include tempered glass or toughened glass. In some embodiments, the tempering process may include cutting annealed glass to the desires size and shape, edging the glass as needed, and heating the annealed glass to 1148 to 1202 degrees Fahrenheit. After heating the glass to between 1148 to 1202 degrees Fahrenheit, the glass may be rapidly cooled via the use of high-pressure blasts of cool air in a quenching process that takes 2 seconds or less to complete.

In some embodiments, the container may be made of laminated glass. In some embodiments, one or more sheets of glass are held in place by a thin polymer interlayer. In some embodiments, the thin polymer interlayer may be composed of a polyvinal butyral. In some embodiments, the thin polymer interlayer may be composed of ethylene-vinyl acetate. In some embodiments, the thin polymer interlayer may be composed of lonoplast polymers, cast in place liquid resin, or thermoplastic polyurethane.

In some embodiments, the container may be made of heat strengthened glass or semi-tempered or semi-toughened glass. In some embodiments, the heat strengthening process giving rise to the heat strengthened glass may involve first cutting annealed glass to the desired shape and size, edging the glass, and heating the annealed glass to a temperature of 1200 degrees Fahrenheit or more. In such embodiments, upon reaching a temperature of 1200 degrees Fahrenheit, the glass may be cooled in a process that takes longer than 2 seconds to complete.

While many of the embodiments disclosed herein largely pertain to the field of dissolving oxygen in wine, it should be understood that the principles and embodiments described herein can be applied to other fluids and beverages (e.g., coffees and teas). Additionally, while many of the embodiments described in this provisional application describe containers made of glass, it should be understood that such embodiments may instead be made of different materials, including but not limited to plastic, wood, metal, plastic with a hydrophobic coating, metal with a hydrophobic coating, wood with a hydrophobic coating, plastic with an omniphobic coating, metal with an omniphobic coating, wood with an omniphobic coating, or some combination thereof.

Some embodiments are expected to achieve a rapid, in-the-glass, aeration process to create 'peaks and valleys' as the inner bowl of the glass has been agitated with a sandblasting process which greatly increases the surface space of the glass. When air and wine interact, two processes can occur in some cases: evaporation and oxidation. Allowing these processes to occur can improve the quality of the wine by changing its chemistry. Evaporation is the phase transition from the liquid state to the vapor state. Volatile compounds evaporate readily in air. When you open a bottle of wine, it often smells medicinal or like rubbing alcohol from the ethanol in the wine. Aerating the wine can help disperse some of the initial odor, making the wine smell better. Letting a bit of the alcohol evaporate allows you to smell the wine, not just the alcohol. Sulfites in wine also disperse when you let the wine breathe. Sulfites are added to wine to protect it from microbes and to prevent too much oxidation, but they smell a bit like rotten eggs or burning matches, so it is not a bad idea to waft their odor away before taking that first sip. Oxidation is the chemical reaction between certain molecules in wine and oxygen from the air. It is like the process that causes cut apples to turn brown and iron to rust. This reaction occurs naturally during winemaking, even after it has been bottled. Compounds in wine which are susceptible to oxidation include catechins, anthocyanins, epicatechins, and other phenolic compounds. Ethanol (alcohol) can also experience oxidation, into acetaldehyde and acetic acid (the primary compound in vinegar). Some wines benefit from the changes in flavor and aroma from oxidation, as it can contribute fruity and nutty aspects.

Exposing wine to air can trigger oxidation and evaporation of the wine. The reaction between gases in the air and wine changes the flavor of the wine. Aerating your wine is expected to help accelerate the evaporation of less favorable sulfites and ethanol compounds of wine and boosts your wine's more favorable tasting and nose notes by removing those less favorable ones mentioned above. Aerating a wine allows it to come to its peak faster. Both a decanter and aerating serve the same purpose—to let the wine "breathe." Decanting does this by expanding the surface area of the wine to increase its contact with the air and allowing those more favorable aromas and flavors to develop as less favorable compounds evaporate. To decant a bottle of wine, it is poured into a carafe or decanter which usually has a wider base than the bottle itself. Aerators expedite the decanting process by introducing air as the wine travels through the device or by dispersing the wine though various spouts. Some embodiments of the present invention are expected to aerate wine sufficiently to achieve the above noted benefits, as discussed in U.S. Prov. App. No. 63/557,346, the contents of which are incorporated by reference.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this provisional application, the word "may" is used in a permissive sense (i.e. having the potential to), rather than the mandatory sense (i.e., meaning must). The words "include", "including", and "includes" and the like mean including, but not limited to. As used throughout this application, the singular forms "a," "an," and "the" include plural referents unless the content explicitly states or indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "when X, Y" and the like, encompass causal relationships in which the antecedent is a necessary causal condition of the consequent, e.g., "state X occurs upon X and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects encompasses both all such attributes or functions being mapped to all such objects and subsets of the attributes or functions being mapped to subsets of the attributes or functions (for examples, both all processors each performing steps A-D, and a case in which processor 1 performs step A, processor 2 performs step B and part of Step C, and processor 3 performs part of step C and step D), unless otherwise indicated. Similarly, reference to "a system" performing step A and "the system" performing step B can include the same device used for performing the steps or may involve multiple devices performing the steps A and B. Further, unless otherwise indicated, statements that one value or action is "based on" another condition or value encompass both instances in which the condition or value is the sole factor and instances in which the condition or value is one factor among a plurality of factors. Unless otherwise stated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C") refer to at least Z of the listed categories (A, B, and C), and do not require at least Z units in each category. Unless specifically stated otherwise, as apparent from the discussion, it is appreciated that throughout this specification discussions utilizing terms such as etching, engraving, texturing, etc. or the like refer to actions or processes of a specific apparatus. Features described with reference to geometric constructs, like "parallel," "perpendicular/orthogonal," "square," "polygonal," "ovular," "circular," or the like should be construed as encompassing items that substantially embody the properties of the geometric construct, e.g., reference to parallel surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first," "second," "third," "given," and so on, if used in the claims are used to distinguish or otherwise identify, and not to show a sequential or numerical limitation.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as non-provisional applications, continuation applications, or continuations-in-part applications, or by amending the present claims. Similarly, due to space constraints, neither the Abstract nor the Summary of the Invention sections should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to be used to limit the scope of the description.

What is claimed is:

1. A method of making a textured container, the method comprising:

obtaining a wine glass comprising a bowl configured to at least partially enclose a liquid; and creating a texture on an upper portion of an interior side wall of the bowl with steps for applying a texture, wherein:

the texture has a root-mean-square surface roughness as measured by a profilometer of between 0.1 and 500 microns; and the texture is created on at least 20% of an interior surface of the bowl.

2. The method of claim 1, wherein creating the texture comprises sandblasting at least a portion of the interior surface of the bowl with a medium.

3. The method for making a textured container of claim 2, wherein the medium used to sandblast is within a range of 20-120 grit, moving at between 200 and 800 miles per hour, after passing through a venturi nozzle of a sandblaster, propelled by air provided at a pressure between 20 and 300 psi (pounds per square inch).

4. The method for making a textured container of claim 2, wherein medium sand used to sandblast is within a range of 40-90 grit.

5. The method for making a textured container of claim 1, wherein creating the texture comprises coating at least a portion of the interior surface of the bowl with a polymer coating having particulates.

6. The method of claim 5, wherein the polymer coating comprises a mixture of an epoxy resin and sand at a ratio of 4 parts epoxy resin and 1 part sand.

7. The method of claim 6, wherein the sand used is 70-grit sand.

8. The method for making a textured container of claim 1, wherein creating the texture comprises etching or engraving at least a portion of the interior surface of the bowl.

9. The method of claim 8, wherein the etching or engraving comprises laser engraving.

10. The method of claim 8, wherein the etching or engraving comprises chemical etching.

11. The method of claim 1, comprising creating a hydrophobic surface on the interior surface of the bowl.

12. The method of claim 1, comprising:

creating a hydrophobic surface on a first part of the interior surface of the bowl; and creating a hydrophilic surface on a second part of the interior surface of the bowl.

13. The method of claim 1, comprising creating a hydrophilic surface on the interior surface of the bowl.

14. The method of claim 1, wherein:

an exterior surface of the bowl does not have the first texture.

15. The method of claim 1, wherein:

the texture is formed by glass from peaks and valleys in the glass on the interior surface.

16. The method of claim 1, wherein:

the texture is created on less than 80% of the interior surface.

17. The method of claim 16, wherein:

the texture is created on more than 50% of the interior surface; and the wine glass, after creating the texture, comprises means for exploit the Gibbs-Marangoni effect to spread a layer of wine across the interior side wall of the bowl.

18. The method of claim 1, wherein:

the texture comprises directional fluid obstructions.

19. The method of claim 1, wherein:

the texture has a root-means-square surface roughness as measured by the profilometer between 10 microns and 100 microns.

20. The method of claim 1, wherein:

the wine glass, after creating the texture, comprises means for oxygenating wine contained within the bowl.

21. The method of claim 20, wherein:

the wine glass, after creating the texture, comprises means for retaining liquid swirled up on the interior side wall of the bowl.

22. The method of claim 20, wherein:

the texture is created with Metal Assisted Chemical Etching.

* * * * *